(12) United States Patent
McCoy et al.

(10) Patent No.: US 9,967,605 B2
(45) Date of Patent: May 8, 2018

(54) METHOD AND APPARATUS FOR PROVIDING CUSTOMIZED MENUS

(75) Inventors: Charles McCoy, Coronado, CA (US); Ling Jun Wong, Escondido, CA (US); True Xiong, San Diego, CA (US); Leo Pedlow, Ramona, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 366 days.

(21) Appl. No.: 13/077,818

(22) Filed: Mar. 31, 2011

(65) Prior Publication Data

US 2012/0227011 A1    Sep. 6, 2012

Related U.S. Application Data

(60) Provisional application No. 61/448,797, filed on Mar. 3, 2011.

(51) Int. Cl.

| | |
|---|---|
| *G06F 3/0481* | (2013.01) |
| *G06F 3/0482* | (2013.01) |
| *H04N 21/258* | (2011.01) |
| *H04N 21/431* | (2011.01) |
| *H04N 21/45* | (2011.01) |

(Continued)

(52) U.S. Cl.
CPC ... *H04N 21/25841* (2013.01); *H04N 21/4312* (2013.01); *H04N 21/4524* (2013.01); *H04N 21/47* (2013.01); *G06F 3/002* (2013.01)

(58) Field of Classification Search
CPC ........ G06F 3/04; G06F 3/0481; G06F 3/0482; G06F 9/4446; G06F 3/16; G06F 21/31; G06F 17/30873; G06F 3/0484; G06F 2203/04804; G06F 3/04842; H04N 21/485; H04N 21/4622; H04N 5/343; H04N 21/47; H04N 47/217; H04N 21/482; H04N 5/44543; H04N 21/84; H04N 21/435; H04N 21/42204; H04N 5/50; H04N 7/17318; H04N 21/4722
USPC .......................................... 715/722, 744, 825
See application file for complete search history.

(56) References Cited

U.S. PATENT DOCUMENTS

| | | | |
|---|---|---|---|
| 6,080,207 A * | 6/2000 | Kroening ............ | G06F 9/44505 717/172 |
| 6,181,344 B1 * | 1/2001 | Tarpenning et al. ......... | 715/863 |
| 6,526,579 B2 * | 2/2003 | Sato ................................ | 725/58 |

(Continued)

FOREIGN PATENT DOCUMENTS

CN          101783906          7/2010

OTHER PUBLICATIONS

Office Action issued in corresponding Chinese application No. 201210036190.3 dated Feb. 11, 2014.

*Primary Examiner* — Doon Chow
*Assistant Examiner* — Le Nguyen
(74) *Attorney, Agent, or Firm* — Haug Partners LLP; William S. Frommer (57) ABSTRACT

A method and apparatus for customizing menus on a consumer electronic device, such as a television, based on, for example, the region where the device is located when it is connected to the network. Although the available network content and services differ by region, a single device may be manufactured and sold in all of these regions and countries, which is more efficient and flexible. This enables separate models to display menus based on uniform menu definitions.

24 Claims, 6 Drawing Sheets

(51) Int. Cl.
*H04N 21/47* (2011.01)
*G06F 3/00* (2006.01)

(56) References Cited

U.S. PATENT DOCUMENTS

| | | | |
|---|---|---|---|
| 6,788,319 B2* | 9/2004 | Matsumoto et al. | 715/841 |
| 6,944,867 B2* | 9/2005 | Cheston | G06F 9/4411 |
| | | | 713/100 |
| 6,993,362 B1* | 1/2006 | Aberg | 455/566 |
| 7,111,249 B2* | 9/2006 | Kenyon | 715/825 |
| 8,213,033 B2* | 7/2012 | Choi | G06F 3/1204 |
| | | | 358/1.1 |
| 8,276,144 B2* | 9/2012 | Burkhart et al. | 718/102 |
| 2001/0045965 A1* | 11/2001 | Orbanes | G06F 3/0346 |
| | | | 715/841 |
| 2003/0093507 A1* | 5/2003 | Shapiro | 709/222 |
| 2005/0216834 A1* | 9/2005 | Gu | G06F 17/2247 |
| | | | 715/248 |
| 2006/0053378 A1 | 3/2006 | Fano et al. | |
| 2006/0294554 A1* | 12/2006 | Hausman | H04N 7/17318 |
| | | | 725/81 |
| 2007/0050733 A1* | 3/2007 | Lee et al. | 715/825 |
| 2007/0061559 A1* | 3/2007 | Kwon et al. | 713/1 |
| 2007/0136681 A1* | 6/2007 | Miller | 715/782 |
| 2007/0150886 A1* | 6/2007 | Shapiro | G06F 8/61 |
| | | | 717/174 |
| 2008/0165136 A1* | 7/2008 | Christie et al. | 345/173 |
| 2008/0235746 A1* | 9/2008 | Peters | H04N 7/17318 |
| | | | 725/111 |
| 2009/0113481 A1* | 4/2009 | Friedman | 725/46 |
| 2009/0320065 A1* | 12/2009 | Sloo et al. | 725/37 |
| 2010/0131983 A1 | 5/2010 | Shannon et al. | |
| 2010/0146497 A1* | 6/2010 | Kogan | G06F 8/65 |
| | | | 717/170 |
| 2010/0229194 A1* | 9/2010 | Blanchard et al. | 725/39 |
| 2010/0251184 A1* | 9/2010 | Majewski et al. | 715/841 |
| 2011/0179159 A1* | 7/2011 | Eglington et al. | 709/224 |
| 2011/0258665 A1* | 10/2011 | Fahrny | H04N 21/4334 |
| | | | 725/47 |
| 2011/0283322 A1* | 11/2011 | Hamano | 725/44 |
| 2012/0102438 A1* | 4/2012 | Robinson | G06F 3/011 |
| | | | 715/863 |

* cited by examiner

METHOD AND APPARATUS FOR PROVIDING CUSTOMIZED MENUS

CLAIM TO PRIORITY

This application claims the benefit of previously filed provisional application U.S. Ser. No. 61/448,797 filed Mar. 3, 2011, which is hereby incorporated by reference in its entirety herein.

CROSS-REFERENCE TO RELATED APPLICATIONS

This application is related to co-pending application U.S. Ser. No. 13/077,656, filed Mar. 31, 2011, which is hereby incorporated by reference in its entirety herein.

BACKGROUND

1. Field of the Invention

This invention relates generally to a system and method of controlling one device capable of accessing Internet Protocol Television (IPTV) and more specifically to providing customized menus.

2. Background Discussion

IPTV is capable of receiving services delivered using the architecture and networking methods of the Internet Protocol Suite as well as services delivered using a broadcasting network. IPTV services include, for example, live television, time-shifted programming, video on demand (VOD), and on-line transactions.

SUMMARY

Typically, a system menu or cross-media bar (XMB) is a fixed architecture, which means the system menu cannot be easily customized to meet the needs of different markets. When the target customers change, a special dedicated software image is required. This dedicated software image change results in not only significant developmental and business costs for a particular customer, but also limits resale of consumer electronics devices (CE), such as TV sets, Blu-ray players, etc, because a consumer electronics device with special software cannot be resold in the main consumer market.

Furthermore, although it is possible to update a TV set using software updates, such updates are costly. Updates also pose the drawback that during the updating process, the operation of the TV cannot be changed. The long update process (normally about 10 minutes each) also leads to an unfavorable user experience.

One embodiment of the present invention is directed to a method and apparatus for customizing menus on a device based on, for example, the region where the device is located when it is connected to the network. Although the available network content and services differ by region, a single device may be manufactured and sold in all of these regions and countries, which is more efficient and flexible. This solves the problem that separate models are needed to be produced and tailored to satisfy the requirement for each region.

Another embodiment of the present invention is directed to a method for generating customized menus for a device. The method includes receiving, at a server, a request from the device and accessing device configuration information. Next menu definitions are generated at the server based on the device configuration information and the generated menu definitions are transmitted to the device. A system menu is generated based on the generated menu definitions.

The method further includes updating the menus over time. This is useful if a new service or application is released after the device is released. This can also be used to remove a menu item for a service that no is longer available.

According to another embodiment of the present invention, the method further includes customizing consumer electronics (CE) manufactures' devices, such as a television (TV) for different markets using a single source code, or two or more sets of source code. A standard TV can be easily customized for the average consumer as well as for business customers. For example, the system menu for a hotel chain may contain its own customized applications (for checking in/out of the hotel, and viewing video on demand) and logos while the system menu for a fast food chain may have other customized settings on the screen.

According to another embodiment of the present invention, the method further includes adding new business partners with similar business requirements without changing software code. For example, business requirements for different hotel chains are likely to have similar software needs. Identifying similar business requirements reduces development resources to develop a specialized hospitality TV just for the hotels.

According to another embodiment of the present invention, the method further includes customizing the menus for a user's device and storing the customizations to a server. The stored customizations can be applied to other devices which are registered to the user's account to the extent that the customized menus are applicable to the device which has been registered.

According to another embodiment of the present invention, the method further includes returning menu definitions from the server to the user's device based on the configuration of the device. The menu definitions returned by the server have images that are appropriately sized for the normal menu item size on the device requesting the menu definitions.

According to another embodiment of the present invention, the menu definitions may be modifications to the system's default menus, such as adding and removing menu items, or can be full menu definitions that completely replace the existing system menus.

According to another embodiment of the present invention, a format used to specify the menu definitions may be XML, or any other binary format or text format.

According to another embodiment of the present invention, the menu definitions may contain predefined locations indicating positions within the menu system where the system will place dynamically generated menu items, such as for media on cards or USB devices that the user has attached or media found on a network, or applications that are installed, or shortcuts generated by the user. There may be separate locations for different types of media, such as video and audio.

According to yet another embodiment of the present invention, the method further includes accommodating frequent changes in the system menu. For example, if there is a special promotion on a particular service in the system menus, the system can ensure this promotion is broadcast on every TV set in a timely and economical manner.

According to another embodiment of the present invention, the method further includes providing an interface for customers to register off the shelf devices to receive customizations they have set up.

According to another embodiment of the present invention, the method further includes making multiple customizations for different groups of devices. For example, a hotel may have different customizations for TV sets in deluxe rooms, regular rooms, suites, meeting rooms and public spaces such as the health club.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices.

Figure 1:
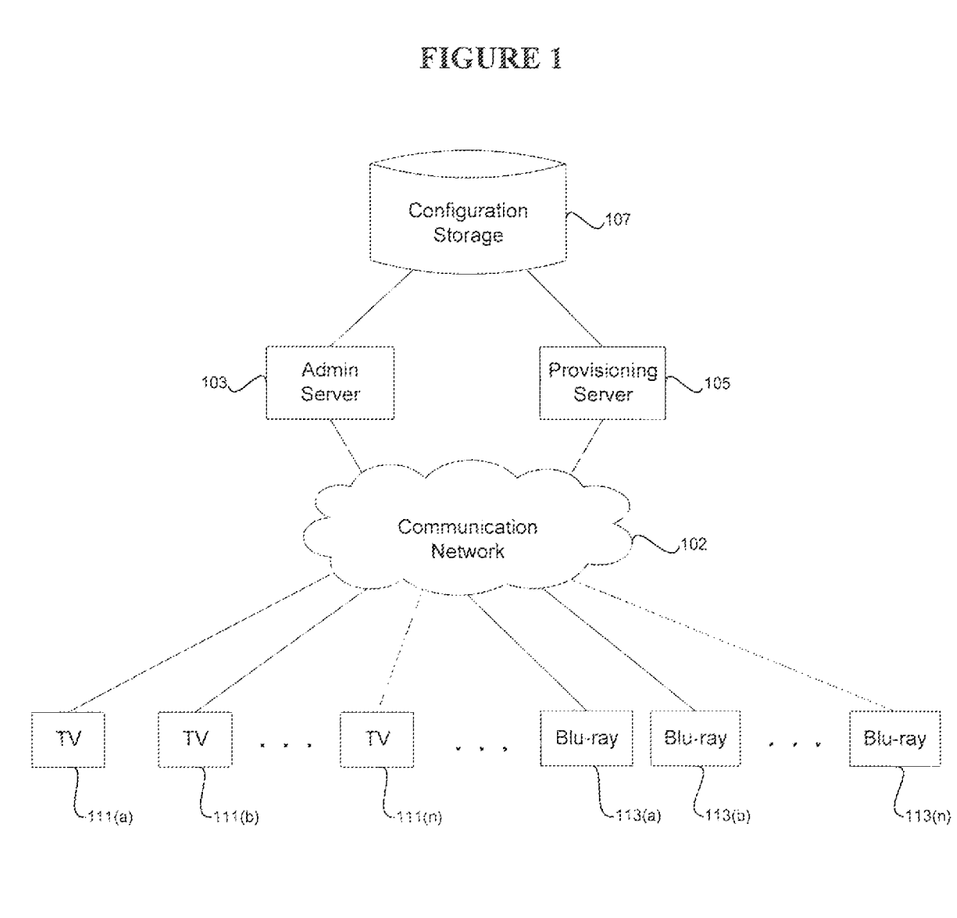
FIG. 1 shows a network diagram that supports embodiments of the present invention.

FIG. 1 shows a network environment that supports embodiments of the present invention. As shown in FIG. 1, the system includes a communication network 102, an admin server 103, a provisioning server 105, a plurality of display devices, shown as TV devices 111(a), 111(b) . . . 111(n), and a plurality of Blu-ray devices 113(a), 113(b) . . . 113(n) (where "n" is any suitable number).

The network 102 is, for example, any combination of linked computers, or processing devices, adapted to transfer and process data. The network 102 may be private Internet Protocol (IP) networks, as well as public IP networks, such as the Internet that can utilize World Wide Web (www) browsing functionality. An example of a wired network is a network that uses communication buses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers.

The admin server module, or facility, or unit, 103 is typically one or more processors with associated memory, such as computers, or other processing devices such as a desktop computer and the like. The admin server 103 may also be used internally to adjust the menus that will be provided to standard consumer devices.

Similarly, the provisioning server module, or facility, or unit, 105 is typically one or more processors with associated memory, such as computers, or other processing devices such as a desktop computer, laptop computer, and the like. The provisioning server is a server that answers the requests from the devices for menu definitions.

The configuration storage 107 stores the menu configurations and the rules for which configurations will be sent to which devices.

It is noted that the admin server 103, the provisioning server 105 and the configuration storage 107 may be a single server, and also may be implemented as one or more separate servers.

Display devices, shown as, for example television devices 111(*a*), 111(*b*) . . . 111(*n*) and Blu-ray devices 113(a), 113(b) . . . 113(*n*) are connected directly to the communication network 102. While televisions 111 and Blu-ray devices 113 are shown, any suitable display unit or module or device may be used to display the video and/or image data and/or audio data and/or audio visual data, as described herein. As shown in FIG. 1, a hotel may use a web browser to connect to the admin server to register devices to their account and administer the menus for those devices.

The admin server 103, the provisioning server 105, TV devices 111(*a*), 111(*b*) . . . 111(*n*) and Blu-ray devices 113(*a*), 113(*b*) . . . 113(*n*) are coupled to network 102 via an associated bi-directional communication medium, which may be for example a serial bus such as IEEE 1394, or other wire or wireless transmission medium.

Figure 2:
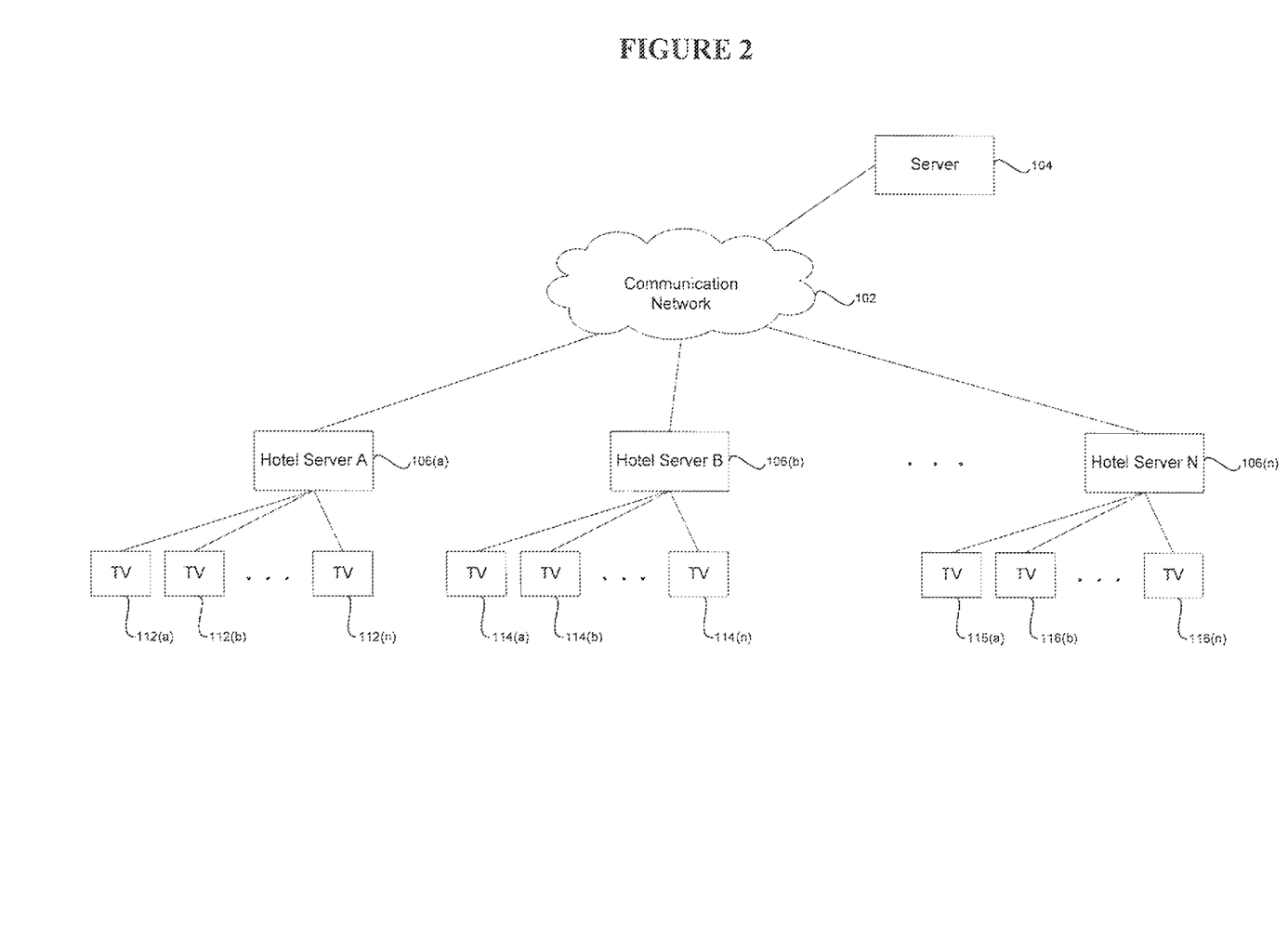
FIG. 2 shows an alternative network diagram that supports embodiments of the present invention.

FIG. 2 shows an alternative network environment that supports embodiments of the present invention. As shown in FIG. 2, the system includes a communication network 102, a server 104, and a plurality of hotel servers 106(*a*), 106(*b*) . . . 106(*n*) (where "n" is any suitable number), and each hotel server is coupled to a plurality of TV devices 112(*a*), 112(*b*) . . . 112(*n*), 114(*a*), 114(*b*) 114(*n*), and 116(*a*), 116(*b*) . . . 116(*n*), (where "n" is any number) respectively. For example, hotel server A 106(*a*) (for example, Hilton Hotel® server) is coupled to TV devices 112(*a*), 112(*b*) . . . 112(*n*), hotel server B 106(*b*) (for example, Best Western® hotel server) is coupled to TV devices 114(*a*), 114(*b*) . . . 114(*n*), and hotel server N 106(*n*) (for example, Marriott® hotel server) is coupled to TV devices 116(*a*), 116(*b*) . . . 116(*n*) (where "n" is any suitable number).

The network 102 is, for example, any combination of linked computers, or processing devices, adapted to transfer and process data. The network 102 may be private Internet Protocol (IP) networks, as well as public IP networks, such as the Internet that can utilize World Wide Web (www) browsing functionality. An example of a wired network is a network that uses communication buses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers.

The server module, or facility, or unit, 104 is typically one or more processors with associated memory, such as computers, or other processing devices such as a desktop computer and the like.

Similarly, the hotel server module, or facility, or unit, 106(*a*), 106(*b*) . . . 106(*n*) (where "n" is any suitable number) is typically one or more processors with associated memory, such as computers, or other processing devices such as a desktop computer, laptop computer, and the like.

It is noted that the server 104 may be separated into an admin server, a provisioning server, and configuration storage as described above, and also may be implemented as one or more separate servers.

Television devices 112(*a*), 112(*b*) . . . 112(*n*), 114(*a*), 114(*b*) . . . 114(*n*), and 116(*a*), 116(*b*) . . . 116(*n*) are located in hotel A, B N, respectively, and coupled to the server of each hotel.

Server module 104, hotel servers 106(*a*), 106(*b*) . . . 106(*n*) are coupled to network 102 via an associated bi-directional communication medium, which may be for example a serial bus such as IEEE 1394, or other wire or wireless transmission medium.

Similarly, Television devices 112(*a*), 112(*b*) 112(*n*), 114(*a*), 114(*b*) . . . 114(*n*), and 116(*a*), 116(*b*) . . . 116(*n*) are coupled to hotel servers 106(*a*), 106(*b*) . . . 106(*n*), respectively, via an associated bi-directional communication medium, which may be for example a serial bus such as IEEE 1394, or other wire or wireless transmission medium.

Figure 3A:
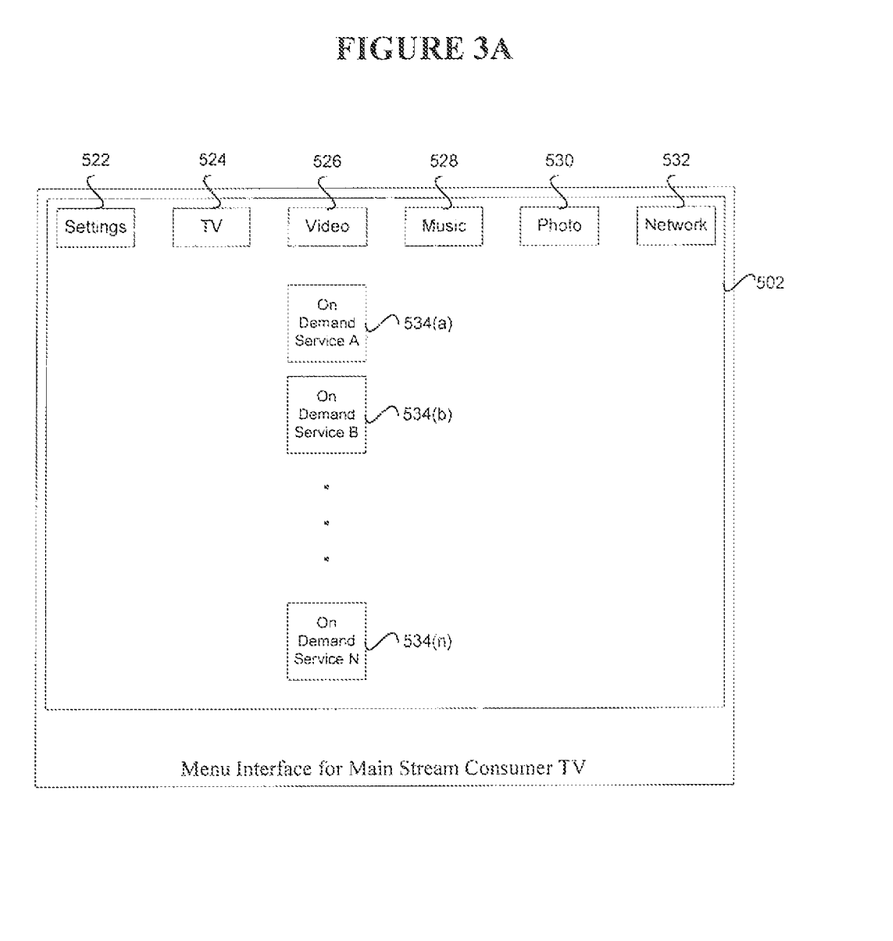
FIGS. 3A-3C illustrate examples of how the menu interface is displayed on different system menus targeted for different markets according to an embodiment of the present invention.
Figure 3B:
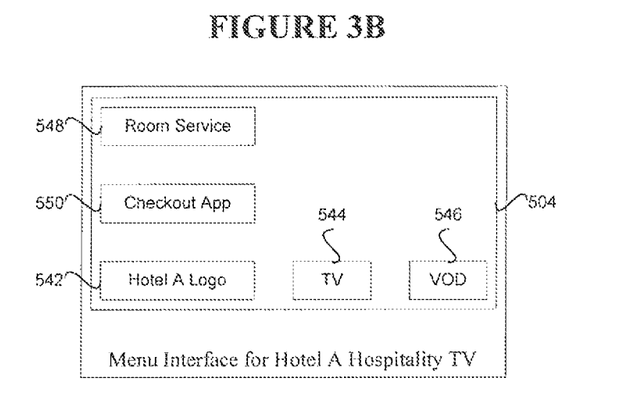
Figure 3C:
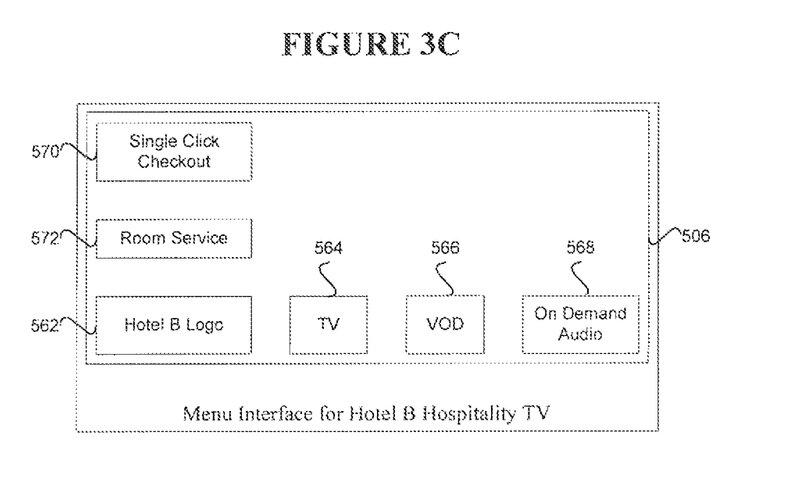

FIGS. 3A, 3B and 3C illustrate examples of a menu interface for different systems. FIG. 3A shows an example of a menu interface for a main stream consumer TV 502. This menu interface depicts top level menu items horizontally and sub-menu items for the currently focused top level menu item vertically. For example, in the menu shown in FIG. 3A, six icons for the top level menu items, Settings 522, TV 524, Video 526, Music 528, Photo 530 and Network 532, are spread horizontally across the screen of TV 502. When a top level menu item is selected, its sub-menu items may appear vertically above and/or below the selected menu item. For example, as shown in FIG. 3A, when top level menu item "Video" 526 is selected, its sub-menu items "On demand service A" 534(*a*), "On demand service B" 534(*b*) . . . "On demand service N" 534(*n*) may be shown on the screen.

It is noted that, besides having the top-level menu laid out horizontally and the next level laid out vertically, which is shown in FIGS. 3A-3C, there are other ways of displaying the menus depending on the user interface on the device, for example, horizontal or vertical alignments at each menu level. There are different ways of making a newly opened sub-menu more prominent than the parent menu, such as sliding the parent menu, darkening the parent menu, removing the display of some details of the parent menu, completely replacing the parent menu display with the sub-menu display, or drawing on a layer on top of the parent menu. A client device with limited display capability may only be able to show a single menu item at a time, in which case the item that currently has the focus will be shown. The menu definitions are independent of the user interface used by the device to navigate the menus, but the system may have rules established for how a particular type of user interface should interpret different aspects of the menu definitions.

FIG. 3B shows an example of a menu interface for a TV 504 located in a hotel. In this menu, three icons, Hotel A Logo 542, TV 544, and VOD (Video on Demand) 546, are spread horizontally across the screen. When icon "Hotel A Logo" 542 is selected, its options for service indications, for example, "Room Service" 548 and a check-out application, for example, "Checkout App" 550 may be shown on the screen.

Similarly, FIG. 3C shows an example of a menu interface for Hotel B Hospitality TV 506. In this menu, four icons, Hotel B Logo 562, TV 564, VOD (Video on Demand) 566, and on Demand Audio 568, are spread horizontally across the screen. When icon "Hotel B Logo" 562 is selected, its options for check-out, "Single Click Checkout" 570 and service, "Room Service" 572 may be shown on the screen.

According to the menus shown in FIGS. 3A-3C, business requirements for different hotel chains like Hotel A and Hotel B are likely to be similar with similar software needs. Therefore, in the present invention, adding new business partners with similar business requirements does not result in software code changes.

Figure 4:
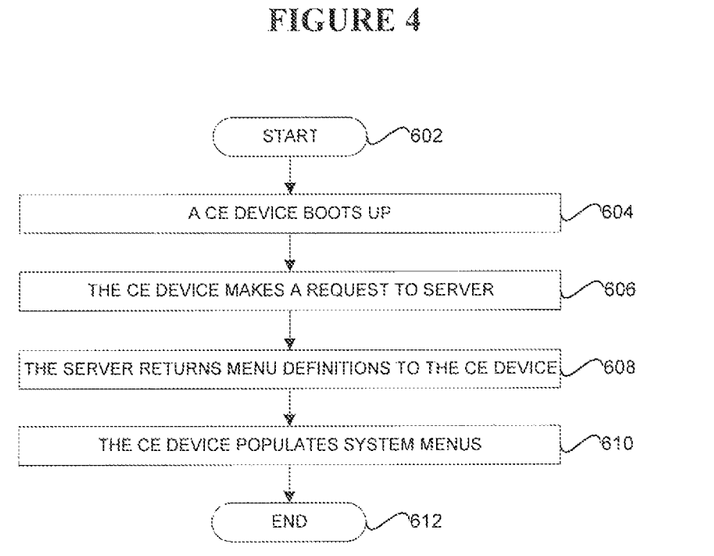
FIG. 4 illustrates an example of steps for populating a system menu according to an embodiment of the present invention.

FIG. 4 illustrates an example of steps for populating a system menu according to an embodiment of the present invention. The system menu may be the menu interface shown in FIGS. 3A-3C, a sub-menu, or any menu that can be displayed. As shown in FIG. 4, the process begins from start step 602. After a consumer electronic device (CE) boots up in step 604, the CE device makes a request to the server in step 606. In step 608 the server returns menu definitions to the CE device based on its configuration. The menu definitions may be defined to contain a list of tags for each menu item being defined, or it may be defined to be structured differently.

Figure 5:
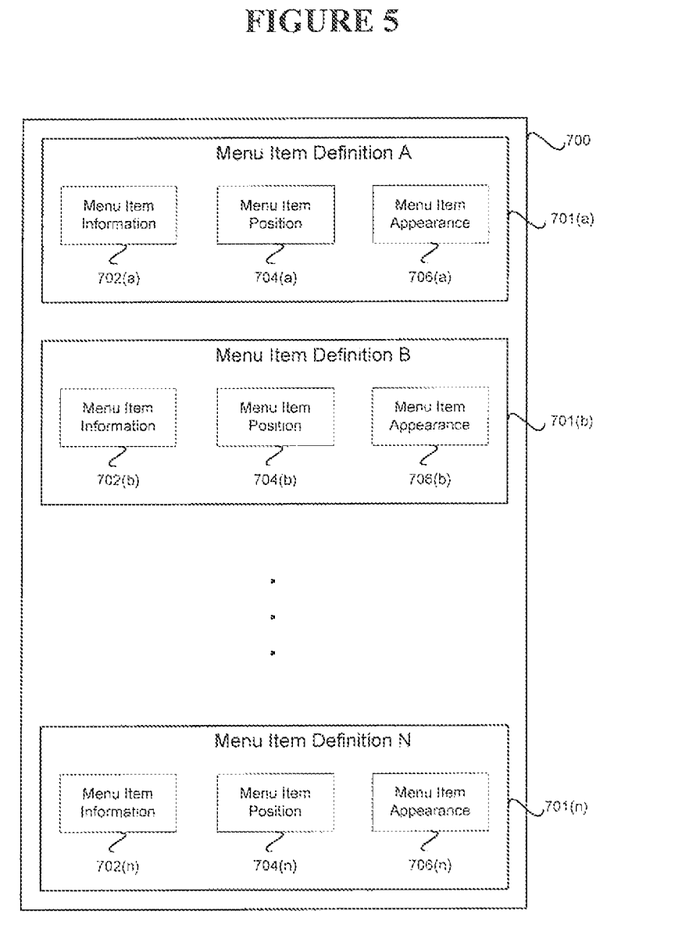
FIG. 5 illustrates an example of a menu definition according to an embodiment of the present invention.

FIG. 5 is a schematic illustration of one example of menu definitions in, for example, XML. It is to be noted that XML is one example of the formats that may be used to specify the menu definitions, and any other binary or text format may be used to specify the menu definitions. As shown in FIG. 5, menu definition module 700 may contain a plurality of menu item definition modules 701(*a*), 701(*b*) . . . 701(*n*), (where "n" is any suitable number) each of which represents information about a respective menu item A, B . . . N, respectively. For example, the menu item definition module may correspond to a top level menu, such as a menu interface of the type illustrated in FIGS. 3A-3C, alternatively, the menu item definition module may correspond to a sub-menu, such as sub-menu item 534 (FIG. 3A) or 548, 550 (FIG. 3B) or 570, 572 (FIG. 3C) or the like. Menu item definition module 701(*a*) comprises, for example, menu item information module 702(*a*), menu item position module 704(*a*) and menu item appearance module 706(*a*). As shown in FIG. 5, menu item definition modules 701(*b*) . . . 701(*n*) have the same structures as menu item definition module 701(*a*).

Menu item information module 702(*a*) may contain information about menu item definition A, for example, computer applications ("apps"), available in this configuration, such as TV applications, IPTV services, etc. The menu item information module also may indicate the launch trigger, or initiating application to execute a menu item when the menu item, such as menu item definition A, is selected.

As shown in FIG. 5, menu item information module 702(*a*) defines the action to be taken when the menu item is selected. For example, besides launching applications, menu items may also have other functions, such as changing a setting, playing a particular piece of content, launching IPTV navigation in a particular service and/or category, making a request to a server, and so on.

Furthermore, the definition of the action to take when the menu item is selected can specify configuration information to send to the application that is executed in addition to the information about which application to execute. Thus, a single application on the device may perform multiple functions initiated by menu items. For example, a menu item may indicate to launch a "parameter adjustment" application to allow the user to adjust the value of a parameter. The configuration information specified for the menu item would indicate which parameter to adjust. Thus, the same device application is used by several different menu items to adjust several different parameter values.

Menu item position module 704(*a*) may be a position of the menu item in an XML tree. According to an embodiment of the present invention, the definitions of the menu items are hierarchal, such that one menu item may contain another sub-menu full of sub-menu items. Items in this sub-menu may contain further sub-menus, and so on. The number of sub-menus within sub-menus defines the depth of the menu or sub-menu. For example a maximum depth of one does not allow any sub-menus, and a maximum depth of two allows the top level menu items to contain sub-menus, but the items in those sub-menus will not contain further sub-menus. The user interface on some devices may have a limit on the depth to which they can show sub-menus, and thus it is desirable to allow a limit to the depth. Because of the parent-child relationship in the XML, the depth of menu items displayed is not limited to just two levels but can reach "n" levels, where "n" is any suitable number. There is no logical boundary to the number of levels that menus may be nested, although implementations may impose a practical limit.

Furthermore, the menu definitions may contain predefined locations indicating positions within the menu system where the dynamic content will be placed. These positions may be identified through menu items with IDs that match pre-defined values. These menu items may be parent menus that have no child menu items defined in them. The device will not display empty parent menus, but when the device dynamically adds one or more items to a parent menu that was empty, that parent menu will then be displayed to the user. For example a device might add an item to the sub-menu for the "Video" menu item if a memory card that contains video files is inserted for playback by the device. In another example the device might add menu items for channels that the user has identified as favorites to a "favorite_channels" sub-menu.

Menu item appearance module 706(*a*) indicates appearance information of the menu item, which includes icon information, label and optionally a longer description that can be displayed when the menu item is selected. According to an embodiment of the present invention, an icon is used to display the menu item to the user, and a cell is the space that a normal menu item occupies in the menus. A menu item can take up more space in the menus if its definition indicates that it takes up more than one cell. The size of a menu item is defined by the number of cells wide by the number of cells high that it occupies. A larger menu item would appear more prominent, and thus may be used for something that should draw the user's attention, such as a hotel logo. In the menu item appearance module 706(*a*) the cell span of each icon is also indicated so that it is possible for the icon to span across more than one basic cell size.

Referring back to FIG. 4, after menu definitions are returned in step 608, based on the returned menu definitions, the consumer electronics device CE populates the system menu with data in step 610. And then the process goes to end step 612.

In the present invention, any application not indicated in the menu definition (or XML) will still remain as a valid application in the software image, but there will be no trigger activation of the application. Therefore, only one common software image can manage a wide array of TVs in different markets. Thus, the same menu definition data may be sent to multiple devices, some of which have the specified application and some of which do not have the specified application, and those having the specified application display the menu item to launch the application. This makes managing the menu definitions simpler as menu definitions can be reused across a wide variety of devices, requiring fewer specializations to the menu definition data.

Conversely, any menu item not applicable to a device, such as a menu item that specifies the execution of an application not present on the device, will not be displayed on the menus (i.e., left off of the menus). Therefore, one large set of menus can be used for an entire product line and the menu items that reference advanced features not found on other TV sets will not be shown on those devices. In other words, a single set of menu definitions may be sent to a range of device models and the items for advanced features will only be displayed on the models that support those advanced features. This makes management of the menu definitions simple as fewer customized versions of the menu definitions are needed.

It is to be noted that the menu definitions may contain texts in each of the languages that is available on the device. Therefore, if the user wants to change the language on the device when the device is not connected to the network to receive updated menu definitions, the text in the menus that are displayed may immediately change to the newly selected language. For example, if a TV supports English, Spanish, and French, the menu definitions may include the text for each of these languages. If the menu definitions only include text in one language (e.g. English), the device may need to access the network to receive new menu definitions (e.g. to support Spanish) before any language change by the user will be reflected in the menu text that is displayed.

In the present invention, when there is a new application available, a TV software update may be helpful.

Yet another embodiment is directed to a hotel that has an account to which off-the-shelf devices can be registered. Such registered devices can be assigned to groups to receive the menu customizations that were established for each group.

According to another embodiment of the present invention, menu items that are not appropriate for a device are not shown or displayed on the device. The menu items that are not appropriate for a device include an item that indicates an application that does not exist in a menu item action. The menu items not appropriate for the device include a menu item that modifies a setting or a parameter that does not exist on the device. The menu items not appropriate for the device include a menu item that pertains to features not available on the device. Also, a menu item that contains a sub-menu that does not include any visible item is not shown. Therefore, a single menu definition could be given to a whole range of devices, which greatly simplifies the management of menu definitions.

According to another embodiment of the present invention, a menu item could be identified with a predefined ID that indicates to the user that the menu item is the location where dynamically generated menu items should be placed. For example, a menu item with an ID of 'video' could indicate that it is a parent menu item for a sub-menu where the device should add dynamic video items, such as an item to navigate through video media on a memory card or USB drive that the user attached to the device.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for customizing an architecture of a system menu for a device that is one of a plurality of devices, the method comprising:
    storing a software image in the device, the software image having a first set of menu items that are applicable to the plurality of devices that can be used in a plurality of different business markets;
    receiving, at a server, a request from the device to customize the architecture of the system menu for the device, the architecture of the system menu defining, for each menu item of the system menu, an application to be launched with a respective menu item, a hierarchical position of the respective menu item in the system menu, and appearance information of the respective menu item on a display screen;
    accessing device configuration information;
    generating menu definitions for the architecture of the system menu at the server based on the device configuration information, the generated menu definitions including a second set of menu items that are selected from the first set of menu items of the software image based on the device configuration information,
    wherein the software image includes at least one menu item corresponding to a first application that is not present in the device, and
    wherein the menu definition of a menu item includes an information module that defines a second application to be launched when that menu item is selected, a position information module that has position information indicating a hierarchical position of that menu item within the architecture and indicating a position where that menu item is displayed, and an appearance module that has the appearance information indicating a size of that menu item and has icon information of that menu item;
    transmitting the generated menu definitions to the device; and generating a system menu having the architecture at the device based on the generated menu definitions,
wherein the menu definitions are generated for the device to display hospitality services to a user, and the plurality of menu items defined by the menu definitions include a menu item for a video service, a menu item for a room service, and a menu item for a checkout service.

2. The method according to claim 1, wherein the device configuration information includes a region where the device is located when the device is connected to a network.

3. The method according to claim 1, wherein the menu definitions indicate modifications to the system menu based on previous requests.

4. The method according to claim 1, wherein the menu definitions indicate modifications to the system menu based on subsequent requests.

5. The method according to claim 1, wherein the menu definitions indicate replacement of one or more menus.

6. The method according to claim 1, further comprising:
generating customizations to the system menu at the server; and
applying the customizations of the system menu to other devices registered to the user's account.

7. The method according to claim 1, further comprising:
generating a second system menu, without changing software image, for another user's device when the another user's device has business requirements as in the user's device.

8. The method according to claim 1, wherein a format for the menu definitions include XML, or any other binary format, or text format.

9. The method according to claim 1, further comprising:
providing an interface for the user to register additional devices to receive customizations to the system menu.

10. The method according to claim 1, further comprising:
making multiple customizations for each of a plurality of groups of devices, the customizations based on configurations of each of the plurality of groups of devices.

11. The method according to claim 1, wherein the device is registered to a user's account.

12. The method according to claim 1, wherein the customized menus use two or more sets of source code.

13. The method according to claim 1, wherein the customized menus use a single source code.

14. The method according to claim 1, further comprising:
generating menu customizations based on user input.

15. The method according to claim 1, wherein the system menu contains one or more sub-menus of a plurality of levels.

16. The method according to claim 1, wherein the menu definitions contain text in a plurality of languages supported by the device, and
when the user changes a current language on the device to a new language, the system menu is shown in the new language using the same menu definitions.

17. The method according to claim 1, wherein a specific menu item allows the user to adjust a value of a parameter or a setting on the device.

18. The method according to claim 1, wherein menu items not appropriate for the device are not shown.

19. The method according to claim 18, wherein the menu items not appropriate for the device include a menu item that indicates an application that does not exist in a menu item action.

20. The method according to claim 18, wherein the menu items not appropriate for the device include a menu item that modifies a setting or a parameter that does not exist on the device.

21. The method according to claim 18, wherein the menu items not appropriate for the device include a menu item that pertains to features not available on the device.

22. The method according to claim 18, wherein a menu item that contains a sub-menu that does not include any visible item is not shown.

23. The method according to claim 18, wherein a single menu definition is used for a plurality of devices.

24. A method for customizing an architecture of a system menu for a device that is one of a plurality of devices, the method comprising:
storing a software image in the device, the software image having a first set of menu items that are applicable to the plurality of devices that can be used in a plurality of different business markets;
sending a request for customizing the architecture of the system menu to a server, the request including device configuration information, the architecture of the system menu defining, for each menu item of the system menu, an application to be launched with a respective menu item, a hierarchical position of the respective menu item in the system menu, and appearance information of the respective menu item on a display screen;
generating menu definitions for the menu architecture at the server based on the device configuration information, the generated menu definitions including a second set of menu items to be included in the menu architecture, the second set of menu items being selected from the first set of menu items of the software image;
wherein the software image includes at least one menu item corresponding to a first application that is not present in the device, and
wherein the menu definition of a menu item includes an information module that defines a second application to be launched when that menu item is selected, a position information module that has position information indicating a hierarchical position of that menu item within the menu architecture and indicating a position where that menu item is displayed, and an appearance module that has the appearance information indicating a size of that menu item and has icon information of that menu item;
receiving from the server the menu definitions; and
generating a system menu having the architecture at the device based on the generated menu definitions,
wherein the menu definitions are generated for the device to display hospitality services to a user, and the plurality of menu items defined by the menu definitions include a menu item for a video service, a menu item for a room service, and a menu item for a checkout service.

* * * * *